(12) United States Patent
Cazier et al.

(10) Patent No.: US 6,900,835 B2
(45) Date of Patent: May 31, 2005

(54) METHOD AND APPARATUS FOR PRIORITIZING MENU ITEMS OF AN ELECTRONIC DEVICE

(75) Inventors: Robert P. Cazier, Fort Collins, CO (US); Amy Battles, Windsor, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 153 days.

(21) Appl. No.: 10/226,465

(22) Filed: Aug. 23, 2002

(65) Prior Publication Data

US 2004/0036779 A1 Feb. 26, 2004

(51) Int. Cl.$^7$ ................................................ H04N 5/76
(52) U.S. Cl. ............................. 348/231.2; 348/333.02; 348/552
(58) Field of Search .................... 348/231.2, 333.02, 348/333.06, 552, 373; 396/373, 374; 725/40, 45–47, 80, 133, 141, 153

(56) References Cited

U.S. PATENT DOCUMENTS

| | | | |
|---|---|---|---|
| 5,396,264 A | * | 3/1995 | Falcone et al. ............. 345/811 |
| 5,477,264 A | * | 12/1995 | Sarbadhikari et al. ... 348/231.6 |
| 5,541,656 A | | 7/1996 | Kare et al. |
| 5,633,678 A | | 5/1997 | Parulski et al. |
| 6,006,039 A | * | 12/1999 | Steinberg et al. ............ 396/57 |
| 2001/0030695 A1 | | 10/2001 | Prabhu et al. |

* cited by examiner

Primary Examiner—Wendy R. Garber
Assistant Examiner—Gary C. Vieaux

(57) ABSTRACT

A method of dynamically prioritizing menu items embedded in an electronic device, such as a digital camera, comprising the steps of selecting a menu item from an ordered list of menu items, recording the selected menu item in a record file stored in the electronic device, analyzing the record file to determine the frequency of use for each menu item, and dynamically prioritizing the ordered list by a firmware embedded in the electronic device based on the user's frequency of use to provide a prioritized ordered list, such that frequently used menu item is ranked higher in the prioritized ordered list.

7 Claims, 2 Drawing Sheets

METHOD AND APPARATUS FOR PRIORITIZING MENU ITEMS OF AN ELECTRONIC DEVICE

BACKGROUND

Electronic devices, such digital cameras, typically come equipped with many features and functionalities that are designed to satisfy a plurality of users, for example from novice to professional users. Generally, these various features are selected, activated or changed using a menu embedded in the electronic device. The user accesses the menu via a Graphical User Interface (GUI) to select various features or options available on the electronic device. However, these menus and GUIs are generally too complicated or difficult to use for first-time users.

With the increasing complexity of features on electronic devices, the number of menu items has increased correspondingly, thereby further complicating the menu system. This leads to an increase in user anxiety and, therefore, serves as a barrier to market adoption. Additionally, the task of navigating through the menu is complicated by the typical small screen size of electronic devices. Electronic device manufacturers have attempted to resolve these problems by activating or setting a fixed set of features (i.e., factory or default settings), so that user can operate the electronic device without accessing the on-board menu system. However, this solution does not account for varying skill levels and interests of the users, and defeats the purpose of offering these various features and functionalities on the electronic devices. One of the reasons for offering these various features or functionalities is to enable the user to customize the electronic device to fit his or her needs and preferences.

BRIEF SUMMARY

A method of dynamically prioritizing menu items embedded in an electronic device, such as a digital camera, comprising the steps of selecting a menu item from an ordered list of menu items, recording the selected menu item in a record file stored in the electronic device, analyzing the record file to determine the frequency of use for each menu item, and dynamically prioritizing the ordered list using firmware embedded in the electronic device based on the user's frequency of use, such that a frequently used menu item is ranked higher in the prioritized ordered list.

BRIEF DESCRIPTION OF THE DRAWINGS

For a more complete understanding of the present invention, reference is now made to the following descriptions taken in conjunction with the accompanying drawing, in which.

DETAILED DESCRIPTION

Figure 1:
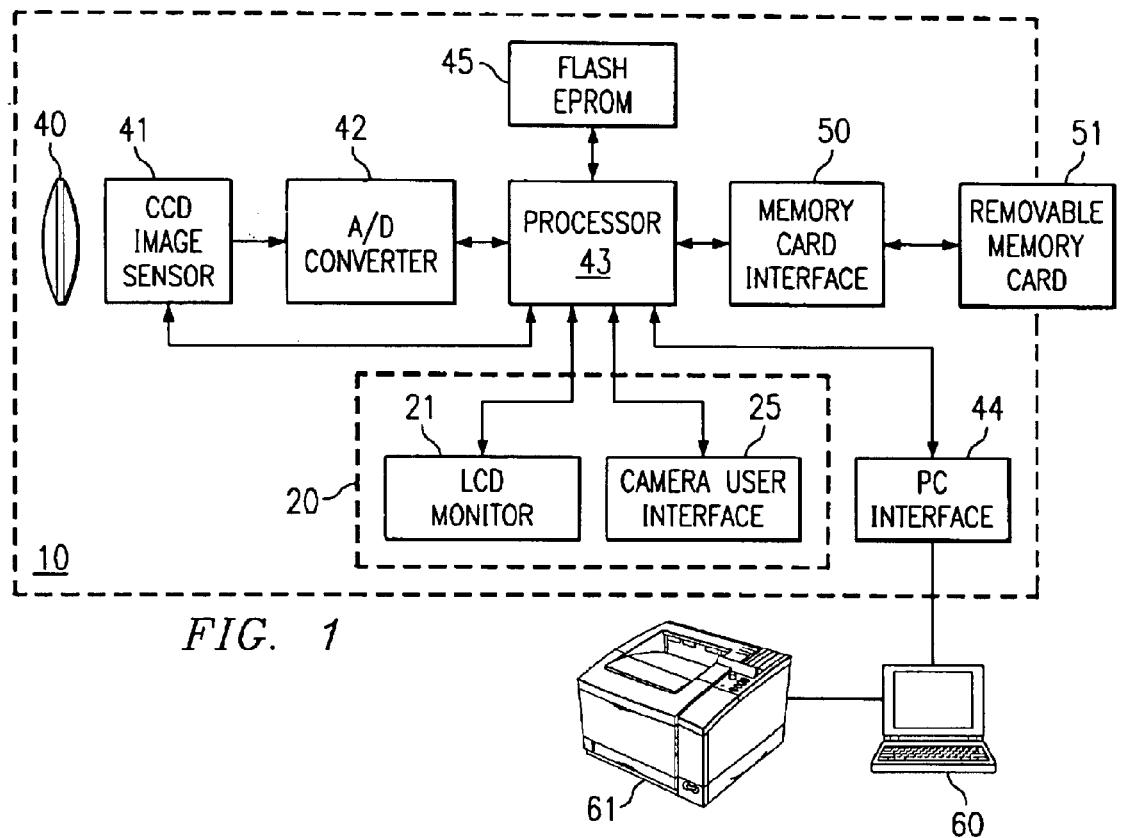
FIG. 1 is a block diagram of a digital camera in accordance with an embodiment of the present invention for prioritizing menu items embedded therein.

An electronic device, such as digital camera 10 in FIG. 1, generally includes firmware stored in a memory device, such as a flash EPROM (Erasable Programmable Read-Only Memory) or the like, which provides normal camera features. It is appreciated that although the present invention is described in conjunction with a digital camera, the invention has applicability to all electronic devices having a menu system embedded therein, such as a VCR, video recorder, television, personal digital assistant, mobile telephone, telephone, telephone answering system, fax machine, and the like.

Figure 2:
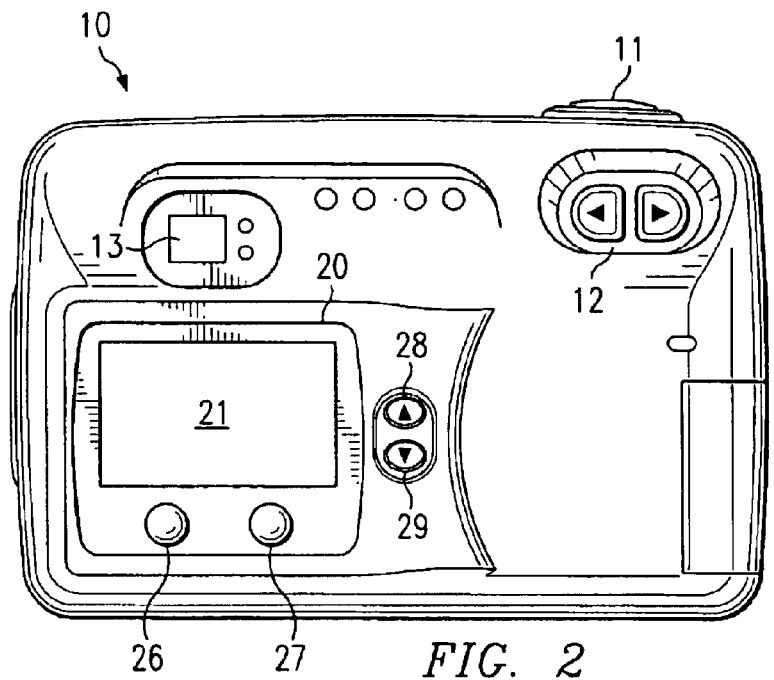
FIG. 2 is a rearview of the digital camera FIG. 1.

Turning to FIGS. 1 and 2, digital camera 10 produces digital images that are stored on a removable memory card or stick 51. The user places a primary subject of a photograph inside an optical viewfinder 13 (FIG. 2) by controlling zoom lens 40 with zoom switch 12. Digital camera 10 typically includes an adjustable aperture and shutter (not shown) for focusing light from the primary subject onto a CCD (Charge-Coupled Device) image sensor 41. When the user depresses shutter button 11 to take a picture, CCD image sensor 41 generates an analog output signal that is converted to digital data by A/D (analog-to-digital) converter 42. The digital data is then send to the processor 43 controlled by firmware stored in a reprogrammable memory, such as flash EPROM 45.

The digital image file is then sent to memory card interface 50 which stores the digital image file on removable memory card 51, memory stick, mini-disk, or the like. It is appreciated that removable memory card 51 can be adapted to the Personal Compute Memory Card International Association (PCMCIA) card interface standard for communication with Personal Computer (PC) 60.

Processor 43 performs color interpolation, and color and tone correction to generated rendered RGB image data. Processor 43 compresses the rendered RGB image data, for example, using Joint Photographic Expert Group (JPEG), and memory card interface 50 stores it as a JPEG or other format image file on removable memory card 51. Processor 43 also provides a thumbnail size (i.e., lower resolution) image data to liquid crystal display (LCD) monitor 21 for display to the user.

The stored images (or files) can be downloaded to a server, computer or PC 60 and stored on a hard drive (not shown) associated with PC 60. The downloaded images can be also printed using printer 61, which may be a photo printer, to produce hard copy prints of the images. PC 60 can be connected to PC interface 44 of digital camera 10 using a standard interface cable (not shown), such as a Universal Serial Bus (USB) cable. Accordingly, PC 60 can download stored images from digital camera via PC interface 44. That is, LCD monitor 21 is used by the user to view images captured from CCD image sensor 41 and stored on removable memory card 51. User selects the images to be transferred to his/her PC 60 connected to digital camera 10, thereby enabling the user to attach the images to email, incorporate the images into web pages on the World Wide Web, etc. Additionally, PC 60 can upload new firmware onto digital camera 10 via PC interface 44. It is to be appreciated that in addition to PC 60, a processing device, such as a personal digital assistant, a cable receiver, a satellite receiver, a set-top box, a home entertainment center box or controller, and the like, can be used to store the record file and to upload new firmware.

Graphical User Interface (GUI) 20 comprises LCD monitor 21 along with texts, menu items or icons displayed thereon and camera user interface 25 (FIG. 2). Camera user interface 25 includes, but not limited to, set button 26, menu button 27, scroll up button 28 and scroll down button 29. GUI 20 is controlled by the firmware stored in flash EPROM 45

Users can customize the operation of digital camera 10 by selecting or activating various functions offered on digital camera 10, such as scrolling through a long list of available functions (for example, menu items, each item depicted by an icon), such as setting or selecting the ISO speed, resolution, compression ratio, print order, album, red-eye elimination, shutter speed, etc. The user clicks menu button 27 of camera user interface 25 to access or display the menu on LCD monitor 21 and scroll through the features/functions list using scroll up button 28 and scroll down button 29. To select a particular feature or function on the list, the user clicks on or highlights a particular option or icon in the menu using set button 26.

Figure 3:
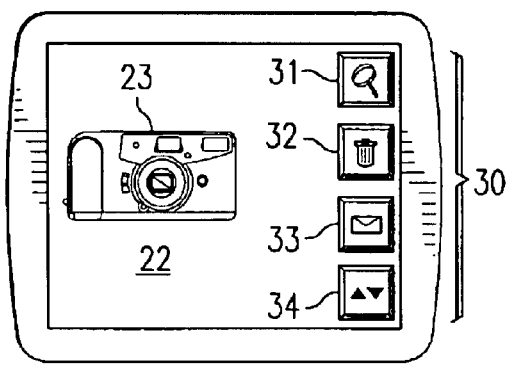
FIG. 3 is an exemplary GUI screen displayed on an LCD monitor in accordance with an embodiment of the present invention.

Turning now to FIG. 3, there is illustrated GUI screen 22 displayed on LCD monitor 21 of digital camera 10. GUI screen 22 displays main image 23 and provides certain exemplary camera functions through a scrollable list of icons or menu items 30. The user can select magnify icon 31 to magnify main image 23, i.e., to rescale main image 23 to magnify the center portion of main image 23. The user can select trash icon 32 to delete the selected image or picture or email icon 33 to email the selected picture. Scroll icon 34 can be used to scroll down the functions/features list to view additional icons which provide additional functions.

In accordance with an embodiment of the present invention, an embedded system or camera firmware (or referred to herein as firmware) is provided on CD-ROM disc (not shown) which can be loaded into PC 60. In accordance with an aspect of the present invention, the user can customize the firmware provided with digital camera 10 using PC 60 before the firmware is uploaded into digital camera 10 via PC interface 44. Processor 43 stores the uploaded firmware in flash EPROM 45. Alternatively, processor 43 uploads the firmware from removable memory card 51 via memory card interface and stores the firmware in flash EPROM 45.

In accordance with an embodiment of the present invention, electronic device or digital camera 10 includes an embedded system or a firmware for prioritizing and displaying menu items or icons 30 on GUI screen 23 of the LCD monitor 21 based upon the frequency of their use by the operator. The firmware of the present invention dynamically prioritizes scrollable list of menu items 30 such that menu items that are frequently used by the operator are placed at the top of scrollable list of menu items 30, thereby displaying the frequently used menu items or icons first.

After the firmware is loaded into digital camera 10, the user can display the menu by clicking menu button 27. As described herein, the user can use scroll up button 28, scroll down button 29 and set button 26 to select the desired menu items or icons (representing various available features, functionalities and options of digital camera 10).

In accordance with an aspect of the present invention, the firmware groups icons or menu items based on the frequency of their use by the operator. For example, the menu items can be grouped into one or more groups: frequently used group, sometimes used group, infrequently used group, never used group, etc. Alternatively, for example, the firmware prioritizes the menu items or icons based on the frequency of their use and then organizes the menu items or icons into groups of five. That is, most frequently used menu items or icons are grouped into the first group (e.g., "top five") and least frequently used menu items and icons are grouped into the last group. This eliminates the need to navigate through an entire list of numerous menu items or icons 30 (preferably, an ordered list) to select a specific icon or menu item that is used many times by the user or operator. The current process of selecting a specific menu item requires the user use the inefficient, tedious and time consuming process of scrolling through a long list of menu items or icons 30 using various small buttons, such as scroll up button 27, etc, commonly available on digital camera 10 and other electronic devices.

Figure 4:
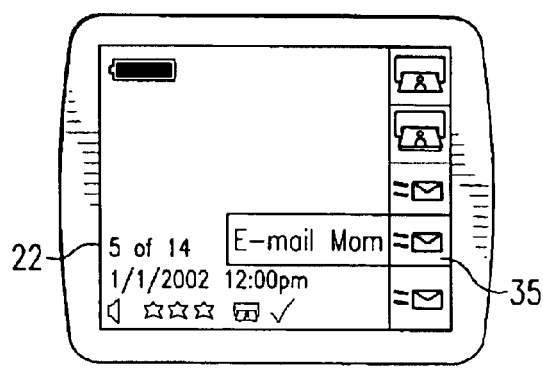
FIG. 4 is an alternative exemplary GUI screen displayed on an LCD monitor in accordance with another embodiment of the present invention.

Accordingly, it is desirable to customize the ordered list of menu items or icons to display menu items or icons that are frequently used by the user first, i.e., on the first GUI screen 22. For example, if the user frequently sends images to his/her mom, then the firmware places or displays email-to-mom icon 35 near the top of list of menu items 30 (or on the first GUI screen 22 presented to the user), as shown in FIG. 4. That is, the firmware reorders the list of the menu items such that email-to-mom icon 35 is ranked higher than other less utilized menu items.

In accordance with an embodiment of the present invention, the firmware or the embedded system generates a record file and records or stores such menu items or icon selections for a pre-determined time, such as a week, month, etc., or until a certain pre-determined event. The certain pre-determined event can include, but is not limited to, record file reaching pre-determined size or an occurrence of an event or state, such as the power on state. It is appreciated that various records of the user's selection can be stored, such as total number of times various menu items were selected, a historical chart indicating the number of times a particular item was selected per day over a specified period of time, e.g., week, month, etc.

Figure 5:
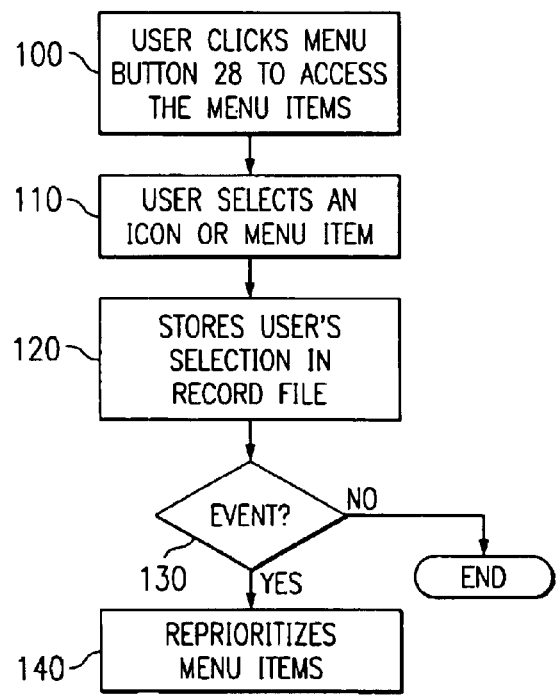
FIG. 5 is a flow chart describing the process of continuously prioritizing a menu in accordance with an embodiment of the present invention.

The process of continuously prioritizing the menu items in accordance with an embodiment of the present invention is described in conjunction with FIG. 5. After the firmware is loaded into digital camera 10, user can display the menu by clicking menu button 27 in step 100. As described herein, the user can use scroll up button 28, scroll down button 29 and set button 26 to select the desired menu items or icons (representing various available features, functionalities and options of digital camera 10) in step 110. The firmware of the embedded system stores the user's selection (i.e., selected menu item or icon) in a record file in step 120. It is appreciated that the record file can be stored in flash EPROM 45, removable memory card 51, dynamic random access memory (DRAM), static random access memory (SRAM), and the like.

Upon occurrence of a certain pre-determined event or upon the expiration of a pre-determined period of time in step 130, the firmware analyzes the record file and dynamically regenerates or reprioritizes the menu or list of menu items 30 on the fly based on the frequency of use of each such menu item by the user, as determined from the record file, in step 140. After the firmware reprioritizes the menu (i.e., reorders the ordered list of menu items 30), the record file is overwritten with new records of user's menu item selections, or the record file is erased and the user's menu item or selections are again stored for pre-determined time or until a certain pre-determined event. It is appreciated that size of the record file is controversial due to the storage and/or memory limitation of digital camera 10 (as well as other similar storage limited electronic device). Also, the code size of the firmware to keep track of the use or selection of various menu items by the user, to analyze the record file and reprioritize the menu is also constrained by the memory/ storage limitation of the digital camera 10. Alternatively, the firmware can download the record file on to PC 60's hard disk via PC interface 44 instead of erasing the record file.

In accordance with an aspect of the present invention, the firmware can utilize the historical information to favor consistent frequent usage of a particular menu item over a sudden surge of usage of a particular menu item. For example, the user always prints the captured image and rarely emails the captured image, but on a given day, the user emails a large number of captured images, thereby resulting in sudden spike or surge in email usage. The firmware of the present invention can still prioritize the print function higher than the email function because of user's consistent frequent usage of the print functions.

It is appreciated that not all menu items are necessarily available to the user at the same time. For example, the electronic device manufacturer may have made a certain set of menu items available as part of a recent upgrade or update to the firmware. Accordingly, this may explain why certain menu items have not been used readily by the user, i.e., market acceptance problems associated of new features/functionalities. Thus, the firmware of the present system considers the longevity of the features (i.e., menu items) in reprioritizing the menu item.

In accordance with an embodiment of the present invention, PC 60 is utilized to store the record file to overcome the storage/memory limitations of a electronic device, such as digital camera 10. That is, PC 60 stores the record file in its hard disk and reprioritizes the menu items for display on GUI screen 22, Since PC 60 generally has larger storage capacity than a electronic device, such as digital camera 10, PC 60 can perform a universal prioritization wherein the menu items are prioritized based on their use by the user and not just over a predetermined period of time. It is appreciated that the present invention is not limited to PC 60, any processing device, such as a server, a personal digital assistant, a cable receiver, a satellite receiver, a set-top box, a home entertainment center box or controller, and the like, can be used to store the record file and reprioritize the menu items. The reprioritized menu is then uploaded into digital camera 10 from PC 60 via PC interface 44. In accordance with an embodiment of the present invention, processor 43 maintains the record file locally in the digital camera 10 and periodically stores the record on PC 60 as backup or updates the record file in PC 60 to perform an universal prioritization of the menu items. It is appreciated that due to the greater processing capacity of PC 60, the present system can reprioritize the menu items using additional factors (such as, whether a particular menu item was even selected by the user) or based on an algorithm.

In accordance with an embodiment of the present invention, the firmware or the embedded system employs a weighting algorithm in conjunction with the record file to independently track the use or selection of the menu items by the user. The use of weighting algorithm by the firmware eliminates the need for another device, such as PC 60, to record the user's selection or use, and reprioritize the menu item. Also, since the firmware is employing two techniques to independently measure or track the use of the menu items, the size of the record file can be also reduced. In accordance with an embodiment of the present invention, the firmware determines new rank for each menu item based on its frequency of use in the current measuring period (as determined from the current record file) and its rank in the last measuring period.

In accordance with an aspect of the present invention, firmware dynamically weighs various factors, such as how long the menu item has been in its current priority position, and frequency (i.e., presence and persistence) of that menu item in the latest or current record file, etc. By considering multiple factors, the menu slowly "drifts" to the most frequently used menu items or icons. It is appreciated that a particular menu item that has been consistently ranked in the top should not be dropped because it was not frequently used in the current measuring period. The application of the weighted algorithm by the firmware is now described in conjunction with the following examples:

| Icon Number | Current Priority | Number Times Found in Current Record File | How long in Existence |
|---|---|---|---|
| Icon 1 | 1 | 0 | 1 month |
| Icon 2 | 2 | 5 | 1 Day |

The firmware using the weighted algorithm determines the priority score of Icon 1 as 6=[30 days* 0.20+0*(1)], and Icon 2 as 5.2=[1 day*0.2+5*(1)]. Based on these calculated priority scores, the firmware ranks Icon 1 higher than Icon 2 even though Icon 2 was used more frequently in this measuring period.=5.2

| Icon Number | Current Priority | Number Times Found in Current Record File | How long in Existance |
|---|---|---|---|
| Icon 1 | 1 | 0 | 2 days |
| Icon 2 | 2 | 5 | 1 Day |

The firmware using the weighted algorithm determines the priority score of Icon 1 as 0.4=[2 days*0.20+0*(1)], and of Icon 2 as 5.2=[1 day*0.2+5*(1)]. Based on these calculated priority scores, the firmware ranks Icon 2 higher than Icon 1 and Icon 1 is demoted. It is appreciated that the firmware can use any weighted algorithm to prioritize the menu items to minimize the effects of any short-lived popularity of a menu item.

In accordance with an embodiment of the present invention, the firmware deletes least frequently used menu items from the menu. Alternatively, the firmware deletes menu items from the menu that are consistently ranked low for a predetermined measuring period, such as five.

What is claimed is:

1. A method of dynamically prioritizing menu items embedded in an electronic device comprising:

selecting a menu item from an ordered list of menu items;

recording said selected menu item in a record file stored in said electronic device;

analyzing said record file to determine said user's frequency of use for each menu item;

dynamically prioritizing said ordered list using firmware embedded in said electronic device based on said user's frequency of use, such that frequently used menu item is ranked higher in said prioritized ordered list; and erasing said record file after prioritizing said ordered list.

2. The method of claim 1 wherein the step of erasing includes the step of downloading said record file onto a processing device before erasing said record file.

3. The method of claim 2 wherein the step of dynamically prioritizing includes the steps of prioritizing said ordered list by said processing device based on said user's frequency of use, and uploading said prioritized ordered list to said electronic device.

4. The method of claim 1 wherein the step of dynamically prioritizing prioritizes based on frequency of menu item's use and said menu item's current rank in said ordered list.

5. The method of claim 1 wherein the step of dynamically prioritizing prioritizes said ordered list periodically.

6. The method of claim 1 wherein the step of dynamically prioritizing prioritizes upon an occurrence of a predetermined event.

7. The method of claim 1 further comprising: displaying said prioritized ordered list of menu items to said user.

* * * * *